(12) United States Patent
Yoshimura et al.

(10) Patent No.: US 10,746,316 B2
(45) Date of Patent: Aug. 18, 2020

(54) SOLENOID VALVE

(71) Applicant: SMC CORPORATION, Chiyoda-ku (JP)

(72) Inventors: Shinichi Yoshimura, Moriya (JP); Kazuhiro Umeda, Noda (JP)

(73) Assignee: SMC CORPORATION, Chiyoda-ku (JP)

( * ) Notice: Subject to any disclaimer, the term of this patent is extended or adjusted under 35 U.S.C. 154(b) by 84 days.

(21) Appl. No.: 16/301,796

(22) PCT Filed: May 10, 2017

(86) PCT No.: PCT/JP2017/017637
§ 371 (c)(1),
(2) Date: Nov. 15, 2018

(87) PCT Pub. No.: WO2017/199803
PCT Pub. Date: Nov. 23, 2017

(65) Prior Publication Data
US 2019/0154166 A1   May 23, 2019

(30) Foreign Application Priority Data
May 19, 2016 (JP) ................................ 2016-100913

(51) Int. Cl.
*F16K 31/06* (2006.01)

(52) U.S. Cl.
CPC ..................... *F16K 31/06* (2013.01)

(58) Field of Classification Search
CPC .. F16K 31/06; F16K 31/0655; F16K 31/0675; F16K 1/34; F16K 27/029
(Continued)

(56) References Cited

U.S. PATENT DOCUMENTS 5,192,936 A * 3/1993 Neff ...................... H01F 7/1607
335/263
6,561,144 B1    5/2003 Muraji
(Continued)

FOREIGN PATENT DOCUMENTS

JP    2000-199411 A    7/2000
JP    2003-172470 A    6/2013
(Continued)

OTHER PUBLICATIONS

International Search Report dated Jul. 4, 2017 in PCT/JP2017/017637 filed on May 10, 2017.

*Primary Examiner* — Eric Keasel
(74) *Attorney, Agent, or Firm* — Oblon, McClelland, Maier & Neustadt, L.L.P.

(57) ABSTRACT

A movable core includes an iron core formed into a plate having a substantially rectangular section, and a valve support portion continuous with the iron core. The valve support portion includes a pair of support arms. The pair of support arms are arranged side by side in a width direction of the movable core to be parallel to each other and seamlessly integrated with the iron core. A surface of the movable core on one side in a thickness direction and a surface of the movable core on the other side are single flat surfaces parallel to each other and extending continuously from the iron core to the pair of support arms. A valve disk is supported between the pair of support arms.

10 Claims, 11 Drawing Sheets

(58) Field of Classification Search
USPC .................................... 335/281, 297, 298
See application file for complete search history.

(56) References Cited

U.S. PATENT DOCUMENTS

| | | | |
|---|---|---|---|
| 6,698,713 B2* | 3/2004 | Sato | F16K 31/0613 |
| | | | 251/129.15 |
| 6,932,320 B2* | 8/2005 | Fukano | F16K 27/003 |
| | | | 251/129.15 |
| 7,520,488 B2* | 4/2009 | Yoshimura | F16K 31/0658 |
| | | | 251/129.16 |
| 2003/0102453 A1 | 6/2003 | Fukano et al. | |
| 2003/0168030 A1 | 9/2003 | Muraji | |

FOREIGN PATENT DOCUMENTS

| | | |
|---|---|---|
| JP | 2013-142470 A | 7/2013 |
| JP | 2015-59597 A | 3/2015 |

\* cited by examiner

SOLENOID VALVE

TECHNICAL FIELD

The present invention relates to a solenoid valve that excites a solenoid to shift a movable core, and operates a valve disk in a direction in which the movable core is shifted, to thereby change connection states between multiple ports.

BACKGROUND ART

A solenoid valve that excites a solenoid to shift a movable core, and operates a valve disk in a direction in which the movable core is shifted, to thereby change connection states between multiple ports has been known well thus far, as disclosed in Patent Literature (PTL) 1.

The movable core of the solenoid valve disclosed in PTL 1 has a substantially rectangular section, and the valve disk, including an elastic portion made of a resin material, is fixed to one end of the movable core in an axial direction. A valve chamber that accommodates the valve disk is formed in a valve body. Multiple ports communicate with the valve chamber. In a bottom surface of the valve chamber, an opening that communicates with one of the ports is formed. To surround the periphery of the opening, a valve seat toward and away from which the elastic portion of the valve disk moves is disposed.

However, the existing solenoid valve usually has a complex structure for connection between the movable core and the valve disk, and, its design usually requires high manufacturing cost. Thus, further reduction of the manufacturing cost is desired with improvement to more reasonable design.

CITATION LIST

Patent Literature

PTL 1; Japanese Unexamined Patent Application Publication No. 2003-172472

SUMMARY OF INVENTION

Technical Problem

A technical object of the present invention to provide, with a low cost, a solenoid valve improved to a more reasonably designed structure, the solenoid valve having a structure that operates a valve disk in response to a movable core being shifted by exciting a solenoid.

Solution to Problem

In order to achieve the above object, a solenoid valve according to the present invention includes a movable core having a first end, on one side in an axial direction, and a second end, on the other side in the axial direction, the movable core shifting in the axial direction in response to an excitation effect of a solenoid; a valve body including a plurality of ports, into or out of which a pressurized fluid flows, and a valve chest with which the ports communicate; and a valve disk accommodated in the valve chest, the valve disk moving toward and away from a valve seat in the valve chest in response to the movable core shifting in the axial direction to change connection states between the ports. The movable core includes an iron core disposed closer to the first end and formed into a plate having a substantially rectangular section, and a valve support portion disposed closer to the second end and continuous with the iron core. The valve support portion includes a pair of support arms. The pair of support arms are arranged side by side in a width direction of the movable core to be parallel to each other and seamlessly integrated with the iron core. Both surfaces of the movable core facing in a thickness direction are single flat surfaces parallel to each other and extending continuously from the iron core to the pair of support arms. The valve disk is supported between the pair of support arms.

In the present invention, the iron core and the valve support portion of the movable core are seamlessly integrally formed, so that the number of components can be reduced, and the structure or form of the movable core can be simplified. Thus, the manufacturing cost can be reduced.

In the present invention, preferably, the valve disk is supported between the pair of support arms to be movable relative to the support arms in the axial direction, an elastic member disposed inside the valve chest seats the valve disk on the valve seat by urging the valve disk toward the valve seat, and the pair of support arms each include a valve engagement portion, which is engaged with an engaged portion of the valve disk seated on the valve seat when the movable core shifts in a direction opposite to the direction in which the elastic member urges the valve disk, and separates the valve disk apart from the valve seat against an urging force of the elastic member.

As described above, instead of being fixed to the movable core, the valve disk is separately provided, so that the valve support portion of the movable core can be designed more freely, and achieve a simpler structure or form.

More specifically, when the valve disk is seated on the valve seat by the elastic member with the movable core being shifted in the direction in which the elastic member urges the valve disk, the valve engagement portion is not in contact with the valve disk.

Thus, the kinetic energy of the movable core can be prevented from being directly exerted on the valve disk when the valve disk abuts against the valve seat to be seated thereon, so that the external force exerted on the valve disk in the axial direction can be reduced. Thus, the valve disk can be prevented from being worn out or irreversibly deformed (permanently deformed) due to the external force being repeatedly exerted on the valve disk, so that the dimension of the valve disk in the axial direction can be prevented from being changed over time. Consequently, the stroke of the movable core, that is, the distance from the valve seat to the valve disk can be prevented from being varied. Thus, the flow rate of the fluid flowing through the valve seat or the responsiveness of the solenoid valve can be prevented from being varied as much as possible.

In a preferable structure of the present invention, the valve seat is disposed on a bottom wall surface of the valve chest facing the second end of the movable core. Far end surfaces of the support arms are flat surfaces perpendicular to an axis. The bottom wall surface has an arm contact surface. The arm contact surface is a flat surface parallel to the far end surfaces of the support arms. The far end surfaces move toward and away from the arm contact surface in response to a shift of the movable core. When the valve disk is seated on the valve seat with the movable core being shifted toward the second end, the far end surfaces of the support arms abut against the arm contact surface, and a gap having a dimension in the axial direction smaller than a stroke of the movable core is formed between the valve engagement portion and the engaged portion of the valve disk.

Thus, the movable core is accurately positioned with respect to the valve body when the valve disk abuts against the valve seat to be seated thereon. Thus, the responsiveness of the solenoid valve can be more accurately controlled.

In a preferable structure of the present invention, the valve seat is a first valve seat formed on the bottom wall surface of the valve chest, and a second valve seat is disposed in the valve chest at a position facing the first valve seat along the axis. The valve disk is disposed between the first valve seat and the second valve seat, and continuously urged by the elastic member toward the first valve seat. The valve engagement portion on the pair of support arms is formed of a thin plate resilient in the axial direction, and the valve engagement portion is engaged with the engaged portion of the valve disk seated on the first valve seat when the movable core shifts from the second end toward the first end, and separates the valve disk from the first valve seat against an urging force of the elastic member to cause the valve disk to be seated on the second valve seat.

Thus, the valve engagement portion disposed on the pair of support arms is formed of a thin plate resilient in the axial direction. When the valve disk abuts against the second valve seat to be seated thereon, the external force exerted on the valve disk in the axial direction can be absorbed by the valve engagement portion to be reduced. This structure can thus prevent as much as possible the valve disk from being worn out or irreversibly deformed (permanently deformed) with such an external force repeatedly exerted on the valve disk.

In a preferable structure of the present invention, the pair of support arms include, at far end portions, engagement hooks protruding in directions away from each other. A cap member formed of a metal thin plate having a substantially U-shaped section is attached to between the far end portions of the pair of support arms, and the cap member has a pair of engagement openings, which are engaged with the engagement hooks of the pair of support arms, and a valve opening, which is formed between the pair of engagement openings and allows the valve disk to be seated on the first valve seat therethrough. The valve engagement portion is disposed at a circumferential portion of the valve opening. The engaged portion is disposed on an end surface of the valve disk facing the first valve seat.

Thus, the cap member formed of a metal thin plate and having a simple structure enables attachment of the valve disk to the valve support portion of the movable core and formation of the valve engagement portion.

In a solenoid valve of the present invention, preferably, the valve disk includes a pair of guide grooves open in opposite directions and extending in the axial direction, the pair of support arms are fitted to the pair of guide grooves to be movable relative to each other in the axial direction, and the valve disk is supported between the pair of support arms to be slidable in the axial direction.

This structure can prevent the valve disk from moving in the direction perpendicular to the axis of the movable core, and prevent the axis of the valve disk from deviating. Thus, the valve disk can be securely seated on the valve seat.

Here, preferably, the valve seat is disposed on a bottom wall surface of the valve chest facing the second end of the movable core. The pair of support arms include engagement hooks protruding in directions away from each other. A cap member formed of a metal thin plate having a substantially U-shaped section is attached to between far end portions of the pair of support arms, and the cap member has a pair of engagement openings, which are engaged with the engagement hooks of the pair of support arms, and a valve opening, which is formed between the pair of engagement openings and allows the valve disk to be seated on the first valve seat therethrough. The valve engagement portion is disposed at a circumferential portion of the valve opening, and the valve engagement portion is engaged with an end surface of the valve disk facing the valve seat when the movable core shifts from the second end toward the first end.

Thus, the cap member formed of a metal thin plate and having a simple structure enables attachment of the valve disk to the valve support portion of the movable core and formation of the valve engagement portion.

In a solenoid valve of the present invention, preferably, the solenoid valve includes a solenoid portion, and the solenoid portion includes a bobbin and a magnetic ring, the bobbin having a center hole in which an iron core of the movable core is fitted to be slidable in the axial direction, the bobbin including a coil wound around an outer periphery of the bobbin, and the magnetic ring being disposed to surround an opening of the center hole at an end of the bobbin located closer to the valve body. The center hole of the bobbin has a substantially rectangular section, and has a pair of first inner surfaces and a pair of second inner surfaces, the pair of first inner surfaces face a pair of surfaces of the iron core parallel to each other and on both sides in a thickness direction of the iron core, and the pair of second inner surfaces face a pair of side end surfaces of the iron core parallel to each other and at both ends in a width direction of the iron core. Step portions are disposed on both side portions of the pair of first inner surfaces in a width direction of the first inner surfaces to reduce a distance between the first inner surfaces to be shorter than a distance between intermediate portions, the step portions are continuous with the second inner surfaces, and a pair of convex threads extending in the axial direction are disposed on the pair of second inner surfaces. The pair of side end surfaces of the iron core are supported by the pair of convex threads to be slidable in the axial direction, the pair of surfaces of the iron core are supported by the step portions to be slidable in the axial direction, and the iron core portion extends through the magnetic ring and has a far end protruding toward the valve body.

In this structure, both side end surfaces of the movable core and both side portions of the pair of surfaces are supported by the convex threads and the step portions to be slidable in the center hole of the bobbin. Thus, the axis of the movable core is effectively prevented from deviating.

Here, preferably, a pair of engagement protruding walls extending in the axial direction from the pair of second inner surfaces are disposed at the opening of the center hole, and the magnetic ring has an engaged hole portion to which the engagement protruding walls are fitted, and the magnetic ring is positioned coaxially with the bobbin as a result of the engagement protruding walls being fitted to the engaged hole portion.

This structure can more securely prevent the efficiency of the solenoid portion from being lowered due to the movable core coming into contact with the magnetic ring.

Advantageous Effects of Invention

As described above, the solenoid valve according to the present invention can reduce the number of components and simplify the structure or form of the movable core by seamlessly integrating the iron core and the valve support portion of the movable core together. This structure can thus reduce manufacturing cost.

DESCRIPTION OF EMBODIMENTS

FIG. 1 to FIG. 15 illustrate a solenoid valve according to an embodiment of the present invention. A solenoid valve 1 according to the present invention mainly includes a main valve portion 2, including a valve disk 3 for switching a flow path through which a pressurized fluid, such as air, flows, and a solenoid portion 7, which drives the valve disk 3 of the main valve portion 2. The main valve portion 2 and the solenoid portion 7 are connected in series in a direction of an axis L of the solenoid valve 1.

Figure 1:
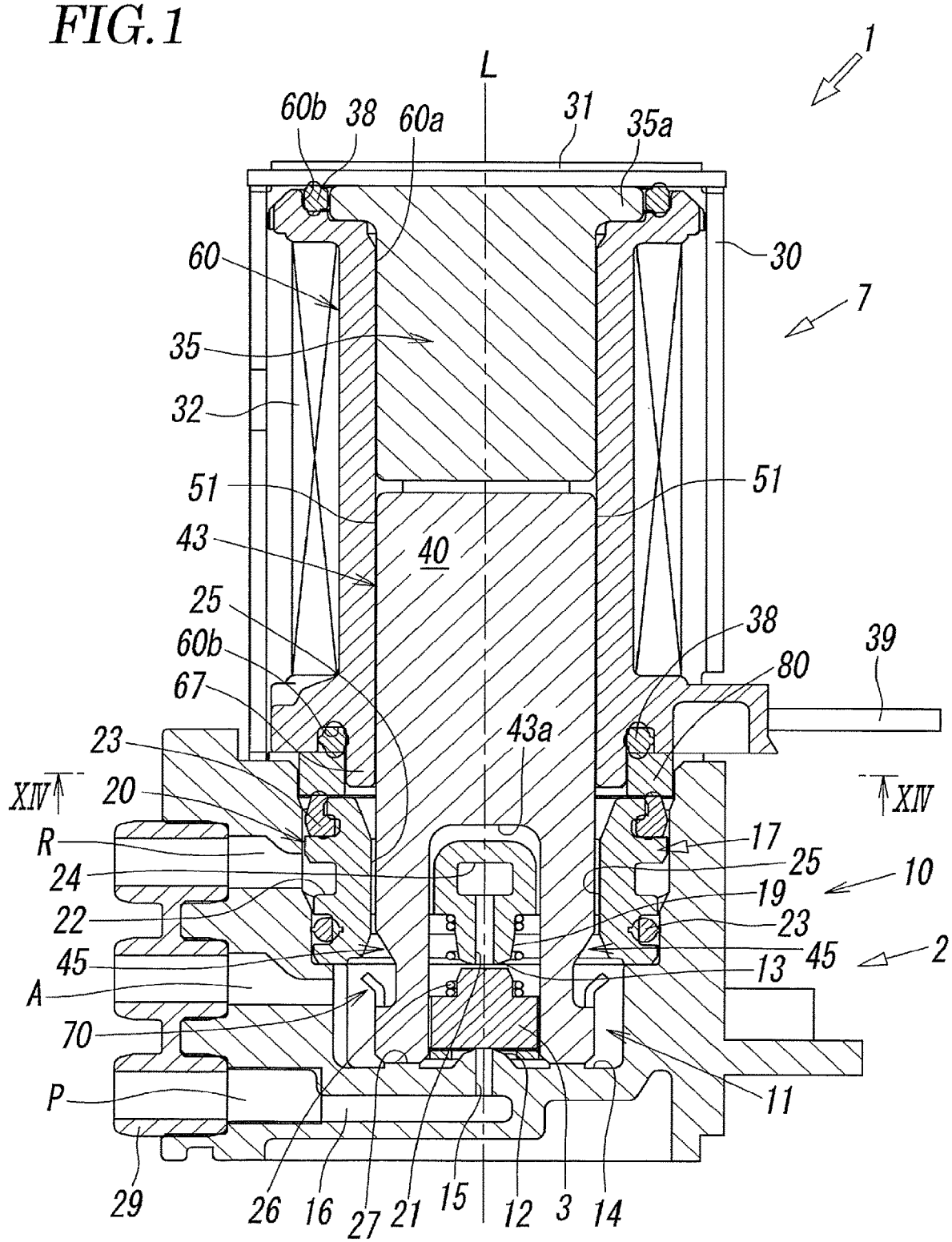
FIG. 1 is a side sectional view of a solenoid valve according to an embodiment of the present invention in a demagnetized state.
Figure 2:
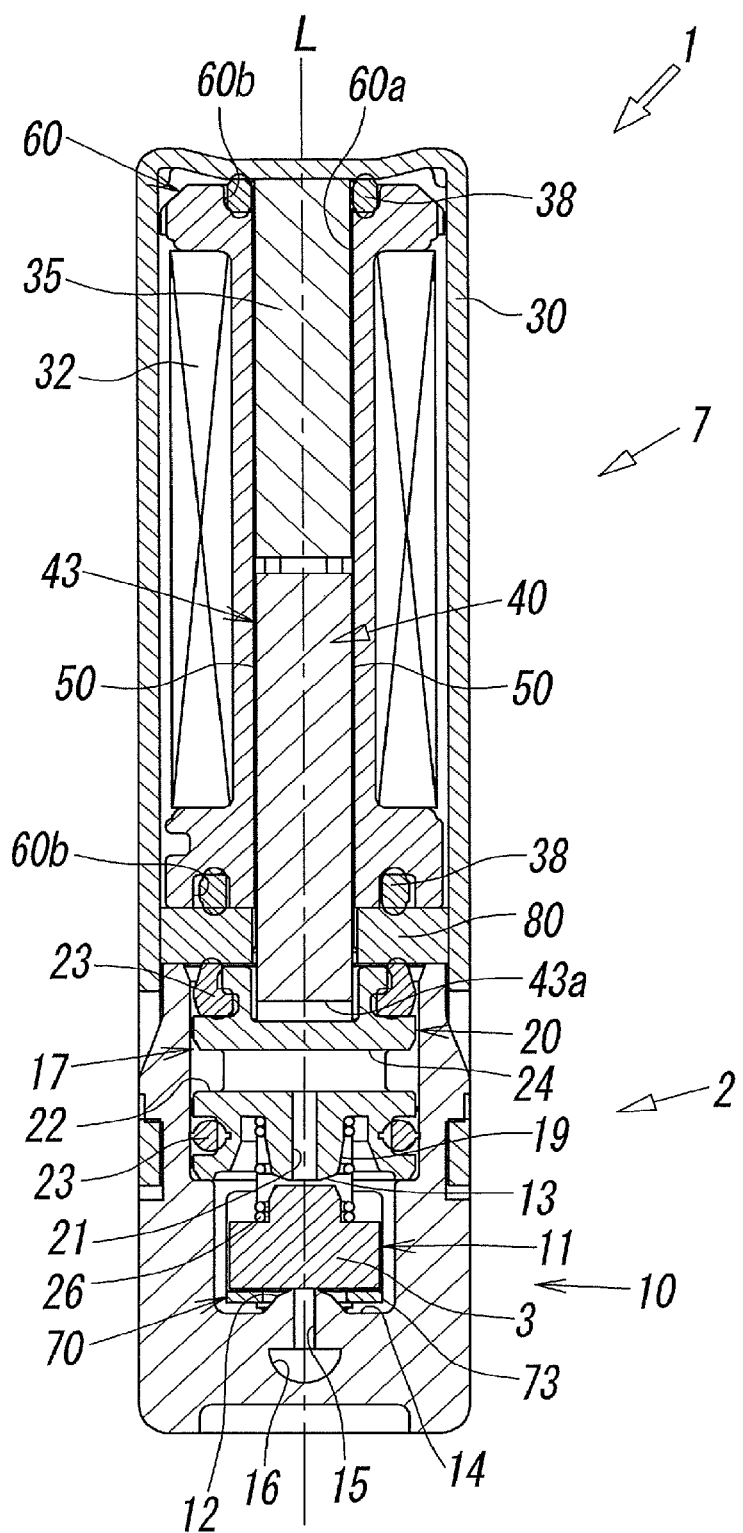
FIG. 2 is a vertical sectional view of the solenoid valve in FIG. 1.

As is clear from FIGS. 1 and 2, the main valve portion 2 includes a valve body 10 having a rectangular section. In a first side surface of the valve body 10, a feed port P, an output port A, and a discharge port R are formed. A valve chest 11, with which the feed port P, the output port A, and the discharge port R communicate, is formed inside the valve body 10. A gasket 29 is attached to these ports.

Figure 4:
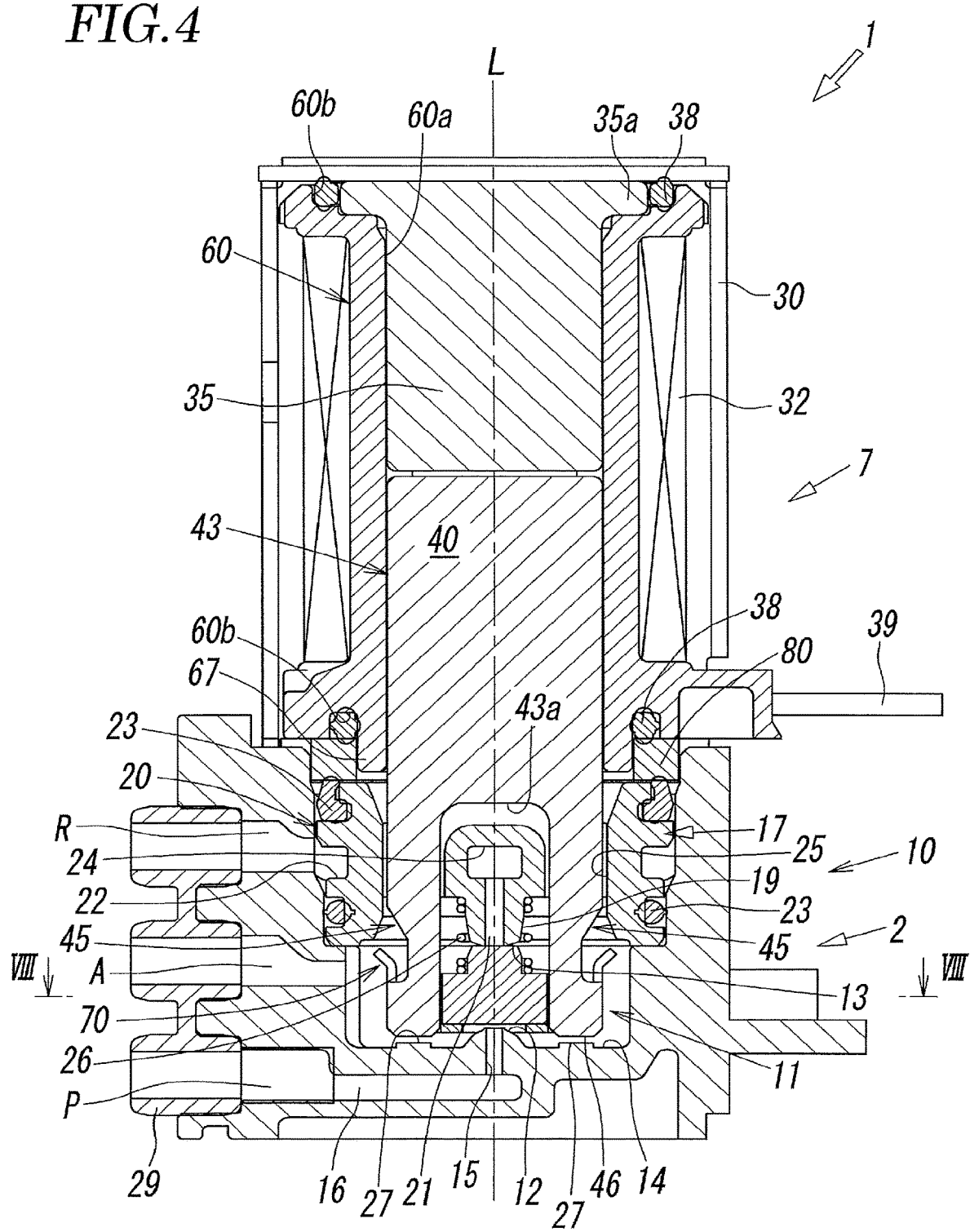
FIG. 4 is a side sectional view of the solenoid valve in an excited state.

As illustrated in FIG. 1 and FIG. 4, a first valve seat 12 and a second valve seat 13, toward and away from which the valve disk 3 moves, are disposed in the valve chest 11. The first valve seat 12 and the second valve seat 13 are disposed to face each other in the direction of the axis L. The first valve seat 12 is disposed on a bottom wall surface 14 of the valve chest 11 to surround a feed through hole 15 at a substantially center portion of the bottom wall surface 14 and to protrude toward the solenoid portion 7. The feed through hole 15 communicates with a feed communication path 16 formed closer to a bottom of the valve body 10 than the bottom wall surface 14. The feed communication path 16 is connected to the feed port P. Thus, the feed port P communicates with the valve chest 11 through the feed through hole 15.

On the other hand, the second valve seat 13 is disposed on a retainer 17 attached to the valve chest 11. The retainer 17 is made of a resin material, and accommodated in the valve chest 11 at a portion closer to an opening edge (closer to the solenoid portion 7) of the valve chest 11 than the valve disk 3. The retainer 17 includes an annular outer circumferential portion 20, which fits to the inner circumferential wall of the valve chest 11, and a protrusion 19, which is disposed inside the annular outer circumferential portion 20 to protrude toward the first valve seat 12.

As illustrated in FIG. 1 and FIG. 2, a discharge through hole 21, which communicates with the discharge port R, is formed at a tip end (apex) portion of the protrusion 19 of the retainer 17. The second valve seat 13 having an annular shape is disposed around the discharge through hole 21. An annular groove 22 is formed in the annular outer circumferential portion 20. Seal members 23 are attached to both sides of the annular groove 22 in the direction of the axis L to hermetically seal off the inside of the valve chest 11. The annular groove 22 communicates with a discharge communication path 24, communicating with the discharge through hole 21. Thus, the discharge port 11 communicates with the inside of the valve chest 11 through the annular groove 22, the discharge communication path 24, and the discharge through hole 21. Between the protrusion 19 and the annular outer circumferential portion 20, a pair of insertion holes 25, through which a pair of support arms 45 of a movable core 40, described below, are inserted (see FIG. 1 and FIG. 9) are formed.

As illustrated in FIG. 1 and FIG. 4, the valve disk 3, which is a poppet valve, is accommodated in the valve chest 11 in the space between the first valve seat 12 and the second valve seat 13. The valve disk 3 is formed of a resin material having elasticity and sealing properties such as a rubber, and formed into a substantially rectangular shape. The valve disk 3 moves toward and away from the first valve seat 12 and the second valve seat 13 to change the connection states between the ports P, A, and R. An elastic member 26 formed of a coil spring is interposed between the valve disk 3 and the retainer 17, fixed to the valve body 10. The elastic member 26 continuously urges the valve disk 3 toward the first valve seat 12. When the solenoid portion 7 is in a non-excited state (demagnetized state), the valve disk 3 is seated on the first valve seat 12 by the urging force of the elastic member 26 (see FIG. 1 to FIG. 3). In the present embodiment, the base end of the protrusion 19 of the retainer 17 functions as a spring seat for the elastic member 26.

Figure 8:
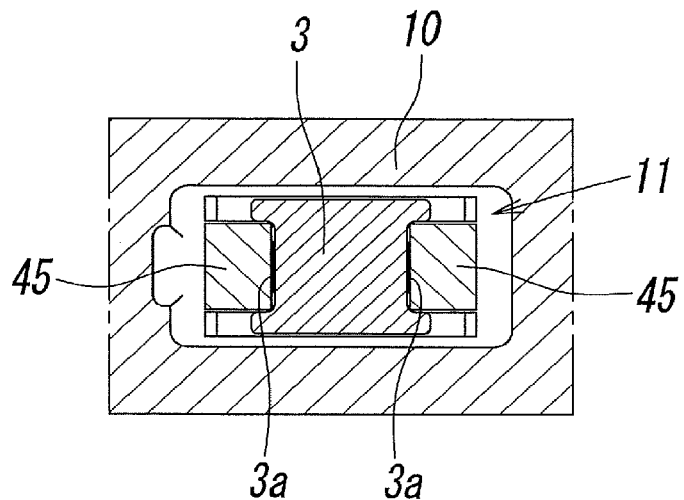
FIG. 8 is an enlarged sectional view of a related portion, taken along line VIII-VIII of FIG. 4.

As illustrated in FIG. 8, the valve disk 3 includes a pair of guide grooves 3a, which are open in opposite directions, in the end surfaces of the valve disk 3 in the width direction (left-right direction in FIG. 8) to extend in the direction of the axis L. When a pair of support arms 45 of the movable core 40, described below, are fitted into the guide grooves 3a, the valve disk 3 is supported between the pair of support arms 45 to be slidable in the direction of the axis L. This structure including the guide grooves 3a can prevent the valve disk 3 from moving in the direction perpendicular to the axis of the movable core 40, and prevent the axis of the valve disk 3 from deviating. Thus, the valve disk 3 can be securely seated on the first valve seat 12 and the second valve seat 13.

Figure 7:
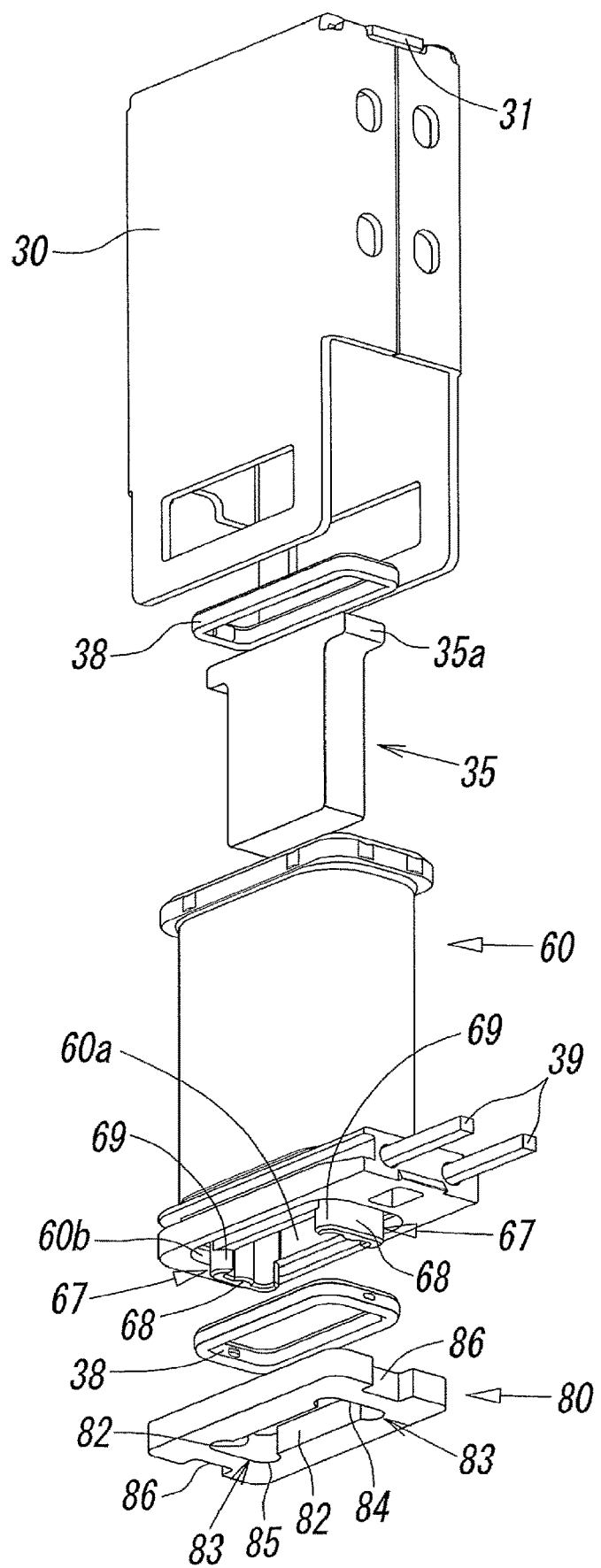
FIG. 7 is an exploded, schematic perspective view of components relating to a solenoid portion according to the present embodiment.

Subsequently, the solenoid portion 7 is described. As illustrated in FIG. 1 and FIG. 7, the solenoid portion 7 includes a magnetic cover 30 having a rectangular cross section with a first end (upper end in FIG. 1) in the direction of the axis L closed with a bonnet 31. As illustrated in FIG. 1, a bobbin 60, around which an exciting coil 32 is wound, a stationary core 35, attached to a center hole 60a of the bobbin 60, the movable core 40, fitted into the center hole 60a to be slidable in the direction of the axis L, and a magnetic ring 80, disposed at an end of the bobbin 60 near the valve body 10 to surround the opening of the center hole 60a, are disposed inside the magnetic cover 30. As illustrated in FIG. 1 and FIG. 4, annular grooves 60b are formed between the bonnet 31 and the bobbin 60, and between the bobbin 60 and the magnetic ring 80. Seal members 38 are attached to the respective annular grooves 60b. A pair of coil terminals 39, electrically connected to the exciting coil 32, protrude from the side surface of the magnetic cover 30. Lead wires are connected to the coil terminals 39.

The stationary core 35 is made of a metal material and formed in a substantially rectangular plate shape. The stationary core 35 includes flange portions 35a at a first end (upper end in FIG. 1) in the direction of the axis L. The stationary core 35 is held between the bobbin 60 and the bonnet 31 while having the flange portions 35a being engaged with an end portion of the bobbin 60 closer to the bonnet 31.

Figure 5:
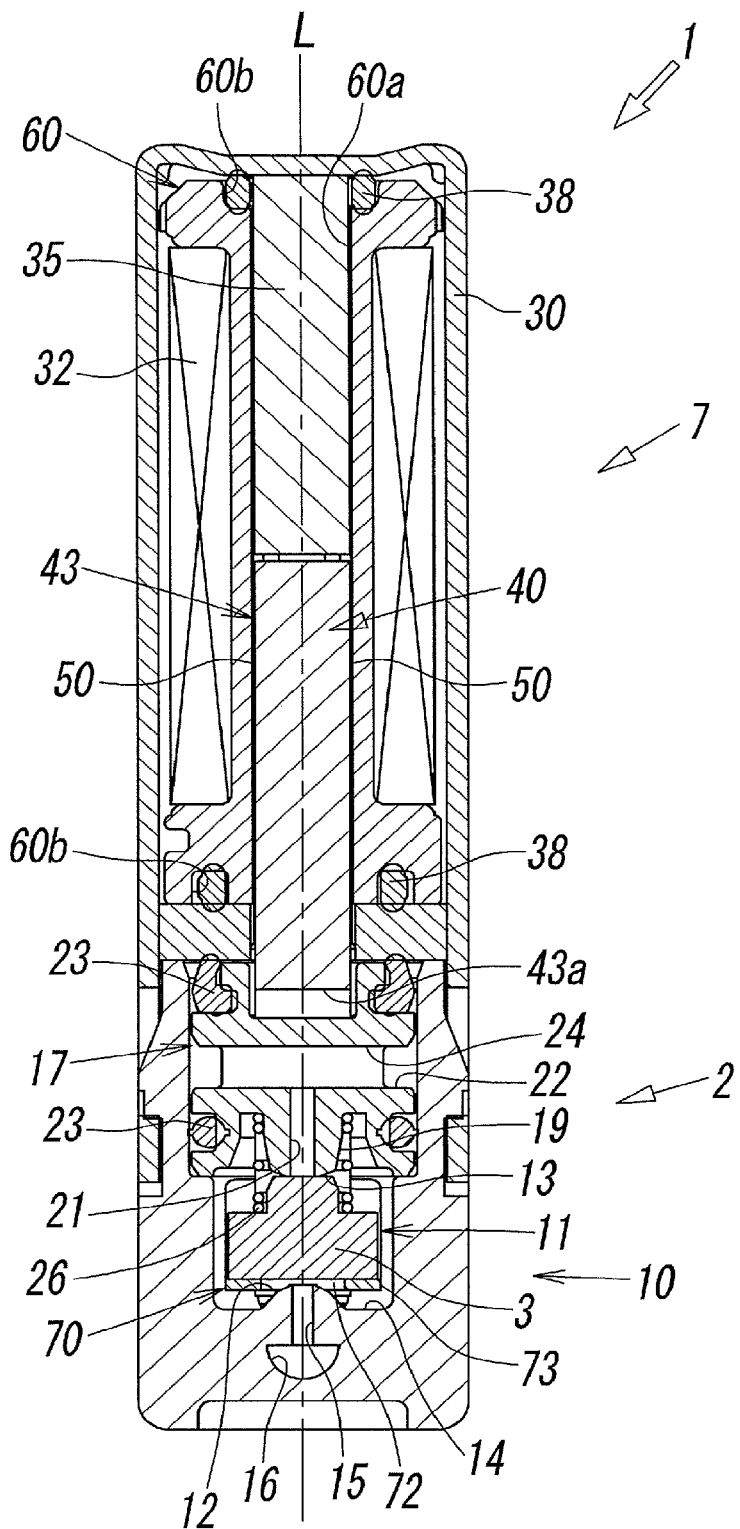
FIG. 5 is a vertical sectional view of the solenoid valve in FIG. 4.
Figure 6:
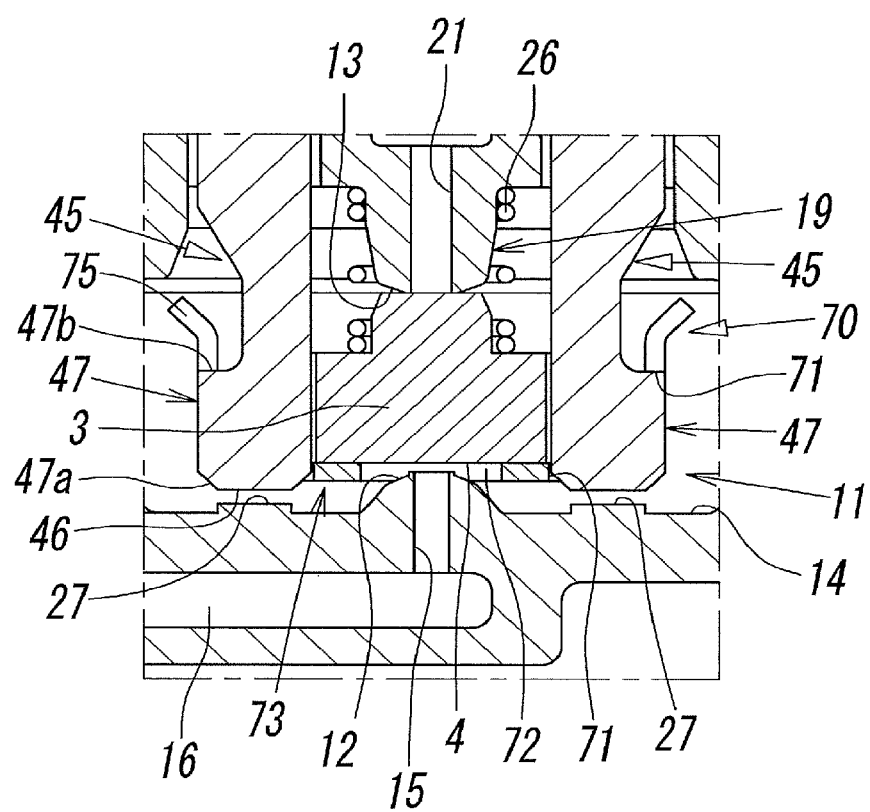
FIG. 6 is a schematic sectional view of a main portion, showing the state around a valve chest in FIG. 4.

On the other hand, the movable core 40 is shifted in the direction of the axis L with exciting and demagnetizing effects of the solenoid portion 7, and, the shift of the movable core 40 in the direction of the axis L seats the valve disk 3 on the first valve seat 12 and the second valve seat 13. Specifically, when the exciting coil 32 is in an energized state, (excited state), as illustrated in FIG. 4 to FIG. 6, the movable core 40 is attracted to the stationary core 35, so that the valve disk 3 releases the first valve seat 12 to be seated on the second valve seat 13, and the feed port P and the output port A communicate with each other through the valve chest 11.

Figure 3:
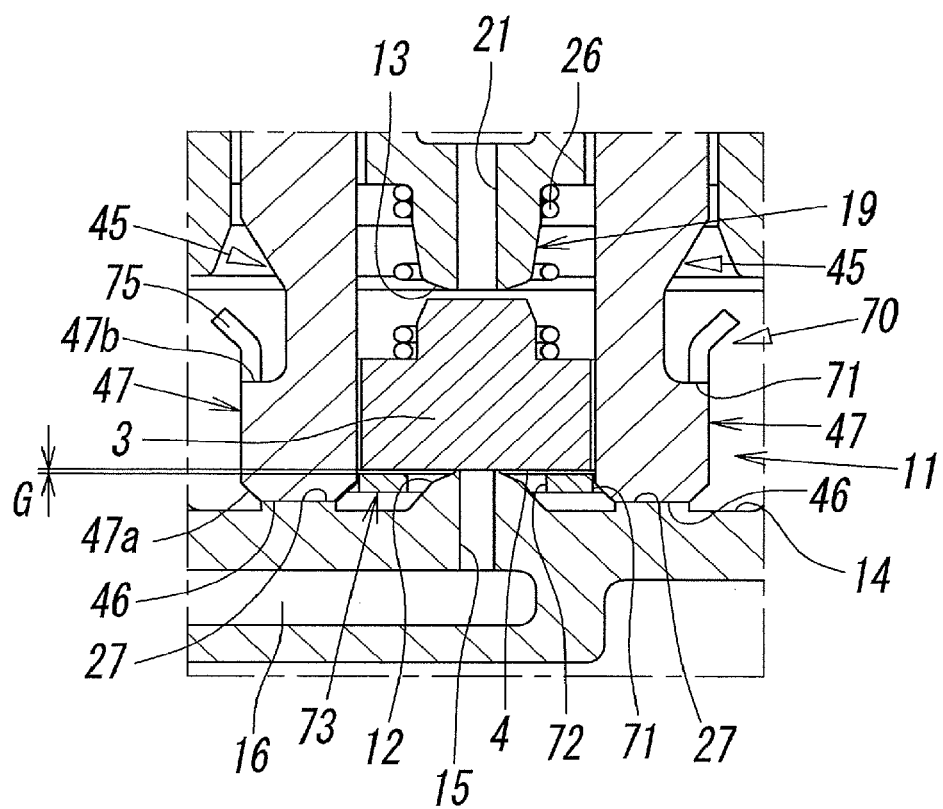
FIG. 3 is a schematic enlarged sectional view of a main portion, showing the state around a valve chest in FIG. 1.

In contrast, when the exciting coil 32 is not energized (demagnetized state), as illustrated in FIG. 1 to FIG. 3, the movable core 40 is spaced apart from the stationary core 35, so that the valve disk 3 releases the second valve seat 13 to be seated on the first valve seat 12, and the output port A and the discharge port R communicate with each other through the valve chest 11.

The movable core 40 has a first end, on one end in the direction of the axis L, and a second end, on the other end in the direction of the axis L. An iron core 43 having a plate shape having a substantially rectangular section is disposed on the first end side. Valve support portions (support arms 45), which protrude in the direction of the axis L beyond an end surface 43a of the iron core 43, are disposed on the second end side. The iron core 43 faces the stationary core 35, and is attracted to or spaced apart from the stationary core 35 in response to the exciting coil 32 being energized or non-energized.

As illustrated in FIG. 1 and FIG. 4, the valve support portion include a pair of support arms 45, which are seamlessly integrated with the iron core 43. These support arms 45 are arranged side by side on both ends of the movable core 40 in the width direction (left-right direction in FIG. 1) to be bilaterally symmetrical with respect to the axis L. The movable core 40 is formed of a single magnetic metal plate. By punching out this metal plate, the iron core 43 and the valve support portion (that is, support arms 45) are formed integrally. Thus, as illustrated in FIG. 2 and FIG. 9 to FIG. 11, a pair of surfaces (side surfaces) 50 parallel to each other on both sides in the thickness direction of the movable core 40 (left-right direction in FIG. 2) are single flat surfaces continuously extending from the iron core 43 to the support arms 45.

As illustrated in FIG. 1 and FIG. 4, the pair of support arms 45 extend into the valve chest 11 of the valve body 10 through the pair of insertion holes 25 open in the retainer 17, and, inside the valve chest 11, fit to the pair of guide grooves 3a (see FIG. 8) formed in the valve disk 3 to be capable of being shifted in the direction of the axis L relative to the valve disk 3. Thus, the valve disk 3 is supported between the pair of support arms 45 to be slidable in the direction of the axis L.

Instead of being fixed to the movable core 40, the valve disk 3 is movably supported by the movable core 40, so that the valve support portion of the movable core 40 can be designed more freely, and achieve a simpler structure or form.

As illustrated in FIG. 3 and FIG. 6, the pair of support arms 45 respectively include, at their far end portions, engagement hooks 47 protruding in directions away from each other. Each of the engagement hooks 47 has an inclined surface 47a at the far end portion. The inclined surface 47a is gradually inclined toward the axis L as it extends closer to a far end surface 46 of the corresponding support arm 45. Each of the engagement hooks 47 has an engagement surface 47b, formed of an end surface perpendicular to the axis L, at the base end portion.

Figure 9:
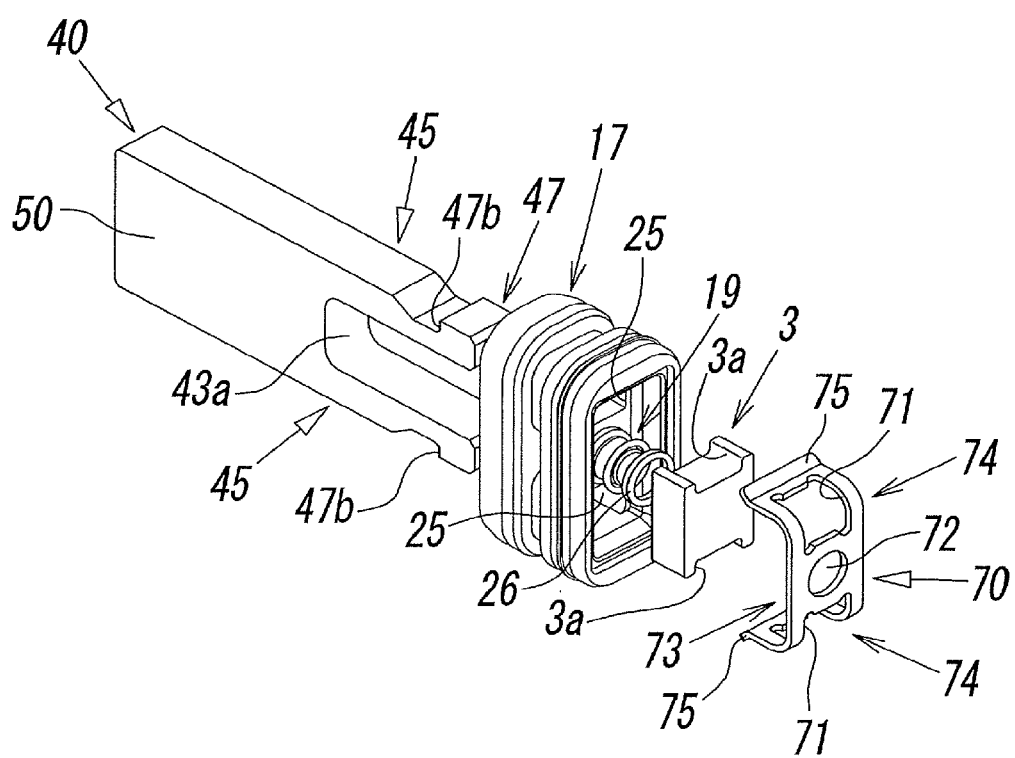
FIG. 9 is a schematic perspective view of the movable core before a cap member is attached to a pair of support arms.

As illustrated in FIG. 3, FIG. 6, and FIG. 9, a cap member 70 stretches between the far end portions of the pair of support arms 45. The cap member 70 is formed of a resilient metal thin plate having a substantially U-shaped section. The cap member 70 has a pair of engagement openings 71, engaged with the engagement hooks 47, and a valve opening 72, located between the pair of engagement openings 71. The valve disk 3 is seated on the first valve seat 12 through the valve opening 72.

As illustrated in FIG. 9, the cap member 70 includes a thin plate-shaped valve engagement portion 73, extending in a direction perpendicular to the axis L and being resilient in the direction of the axis L, and a pair of locking portions 74, extending from the left and right ends of the valve engagement portion 73 in a direction substantially perpendicularly. Connection portions between the valve engagement portion 73 and the locking portions 74 are smoothly curved in an arc. When the movable core 40 is attracted to the stationary core 35, the valve engagement portion 73 is engaged with the elastic portion 4 (end surface facing the first valve seat 12) of the valve disk 3 seated on the first valve seat 12, as illustrated in FIG. 6. Thus, the valve disk 3 is separated from the first valve seat 12 against the urging force of the elastic member 26, and seated on the second valve seat 13. The valve engagement portion 73 has the valve opening 72. As illustrated in FIG. 3, the valve disk 3 can be seated on the first valve seat 12 through the valve opening 72.

As illustrated in FIG. 9, the engagement openings 71 are rectangular and formed at portions across the valve engagement portion 73 and the locking portions 74. Bent portions 75, bent outward, are formed at the far ends of the locking portions 74. As described above, the cap member 70 formed of a metal thin plate and having a simple structure enables attachment of the valve disk 3 to the valve support portion (support arms 45) of the movable core 40 and formation of the valve engagement portion 73.

The cap member 70 is attached to between the support arms 45 in the following manner. Firstly, as illustrated in FIG. 9, the movable core 40, the retainer 17, the elastic member 26, the valve disk 3, and the cap member 70 are prepared. The elastic member 26 formed of the coil spring is attached to the outer circumference of the protrusion 19 of the retainer 17. Thereafter, the movable core 40 and the retainer 17 to which the elastic member 26 is attached have their axes aligned with each other, and the pair of support arms 45 are inserted into the insertion holes 25 of the retainer 17 from one side of the retainer 17 in the direction of the axis L (the side opposite to the protrusion 19). Concurrently, the valve disk 3 is pushed toward the retainer 17 against the urging force of the elastic member 26, from the side opposite to the movable core 40 (support arms 45) (from the side of the protrusion 19). Thus, the guide grooves 3a of the valve disk 3 are fitted to the pair of support arms 45, extending from the insertion holes 25 (see FIG. 10). In this state, the cap member 70 is attached to between the support arms 45.

Figure 10:
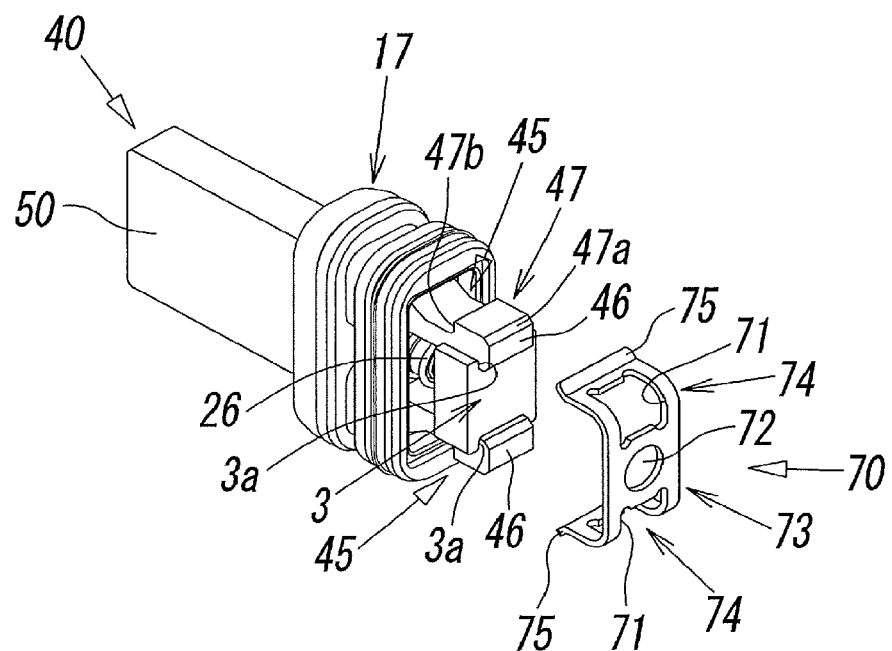
FIG. 10 is a schematic perspective view of the state where guide grooves of a valve disk are fitted to between the pair of support arms from the state in FIG. 9.
Figure 11:
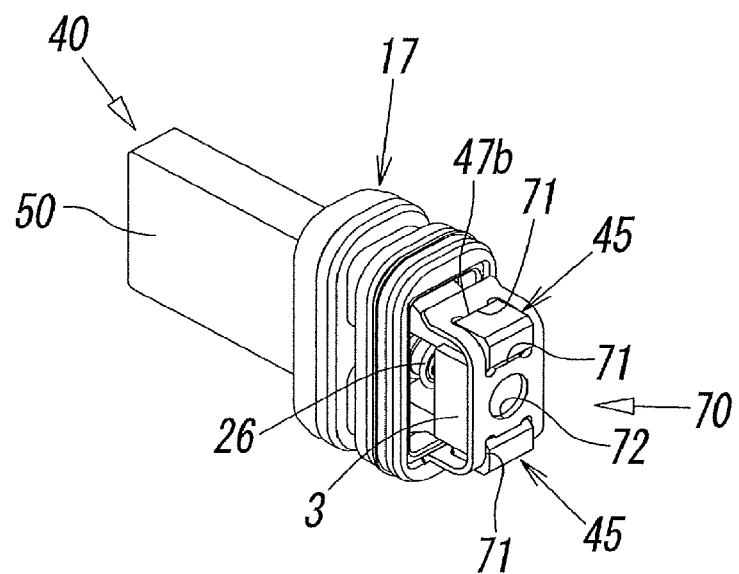
FIG. 11 is a schematic perspective view of the state where the cap member stretches between the pair of support arms from the state in FIG. 10.

Here, as illustrated in FIG. 10, when the cap member 70 is pushed relative to the support arms 45 while having the opening side (side of the locking portions 74) of the cap member 70 facing the far end surfaces 46 of the support arms 45, the bent portions 75 of the pair of locking portions 74 of the cap member 70 ride the inclined surfaces 47a of the engagement hooks 47 at the far end portions of the support arms 45. Thus, the distance between the pair of locking portions 74 is elastically enlarged. Then, the opening edges (free ends) of the engagement openings 71 of the locking portions 74 are shifted to the positions of the engagement surfaces 47b of the engagement hooks 47, and the positions of the engagement openings 71 and the positions of the engagement hooks 47 are aligned with each other. Thus, the enlarged locking portions 74 restore with elasticity, and the engagement hooks 47 fit in the engagement openings 71, as illustrated in FIG. 11. The cap member 70 thus finishes being attached to the support arms 45.

As illustrated in FIG. 3, FIG. 4, and FIG. 6, the far end surfaces 46 of the pair of support arms 45 are flat surfaces perpendicular to the axis L. On the other hand, on the bottom wall surface 14 of the valve chest 11 facing the far end surfaces 46, a pair of arm contact surfaces 27, toward and away from which the far end surfaces 46 move, are formed. The pair of arm contact surfaces 27 are flat surfaces parallel to the far end surfaces 46 of the support arms 45. The arm contact surfaces 27 are disposed on both sides of the first valve seat 12 on the bottom wall surface 14, that is, on both sides of the valve body 10 in the width direction (left-right direction in FIG. 3), and protrude toward the solenoid portion 7. The height of the arm contact surfaces 27 by which the arm contact surfaces 27 protrude from the bottom wall surface 14 into the valve chest 11 is lower than the height by which the first valve seat 12 protrudes from the bottom wall surface 14 into the valve chest 11. Specifically, the arm contact surfaces 27 are located closer to the bottom wall surface 14 than the first valve seat 12.

In the present embodiment, as illustrated in FIG. 1 and FIG. 3, when the movable core 40 is shifted toward the second end (toward the first valve seat 12) and the valve disk 3 is seated on the first valve seat 12, the far end surfaces 46 of the pair of support arms 45 abut against the arm contact surfaces 27. At this time, as illustrated in FIG. 3, the valve engagement portion 73 of the cap member 70 is not in contact with the engaged portion 4 of the valve disk 3, and a gap G, smaller than a stroke of the movable core 40, is formed between the valve engagement portion 73 and the engaged portion 4.

Figure 12:
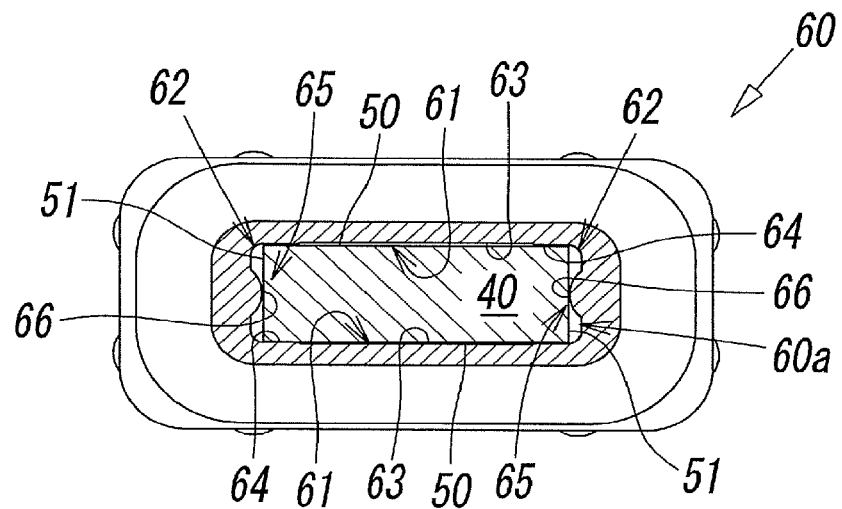
FIG. 12 is a schematic sectional view of the state where the movable core is accommodated in a center hole of a bobbin.
Figure 13:
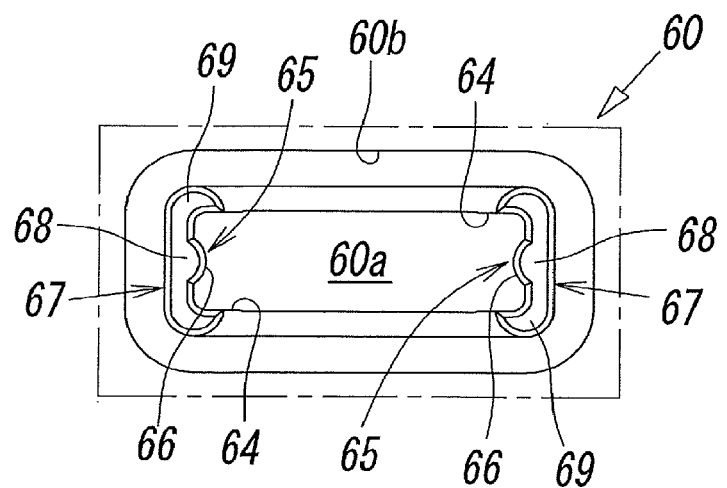
FIG. 13 is a schematic plan view of an opening of the bobbin located closer to the valve body.

As illustrated in FIG. 12, the center hole 60a of the bobbin 60, accommodating the movable core 40, has a substantially rectangular section with a pair of first inner surfaces 61 and a pair of second inner surfaces 65. The first inner surfaces 61 face a pair of surfaces 50 on both sides of the movable core 40 in the thickness direction, and the second inner surfaces 65 face a pair of side end surfaces 51 parallel to each other and at both ends of the movable core 40 (iron core 43) in the width direction (left-right direction of FIG. 12).

On both side portions 62 of the pair of first inner surfaces 61 in the width direction, step portions 64 are formed to reduce the distance between the first inner surfaces 61 to be smaller than a distance between intermediate portions 63 held between the both side portions 62. The step portions 64 extend in the direction of the axis L, and are connected to the second inner surfaces 65 from both side portions 62 of the first inner surfaces 61 in the circumferential direction of the center hole 60a. A pair of convex threads 66 are formed on the pair of second inner surfaces 65 to extend in the direction of the axis L. The convex threads 66 are formed on the second inner surfaces 65 to face each other (face inward), and have an arc-shaped section.

When the iron core 43 of the movable core 40 is inserted into the center hole 60a of the bobbin 60, the pair of side end surfaces 51 are supported by the pair of convex threads 66 to be slidable in the direction of the axis L, and the pair of surfaces 50 are supported by the step portions 64 to be slidable in the direction of the axis L. The movable core 40 extends through the magnetic ring 80 to have its far end protruding toward the valve body 10.

In the present embodiment, both side end surfaces 51 of the movable core 40 and both side portions of the pair of surfaces 50 are supported by the convex threads 66 and the step portions 64 to be slidable in the center hole 60a of the bobbin 60. Thus, the axis of the movable core 40 is effectively prevented from deviating.

As illustrated in FIG. 7 and FIG. 13 to FIG. 15, a pair of engagement protruding walls 67 are disposed in the opening of the center hole 60a facing the valve body 10. The engagement protruding walls 67 extend from the pair of second inner surfaces 65 in the direction of the axis L. The magnetic ring 80 disposed to surround the center hole 60a has an engaged hole portion 81. When the engagement protruding walls 67 fit into the engaged hole portion 81, the magnetic ring 80 is positioned to be coaxial with the bobbin 60.

Figure 14:
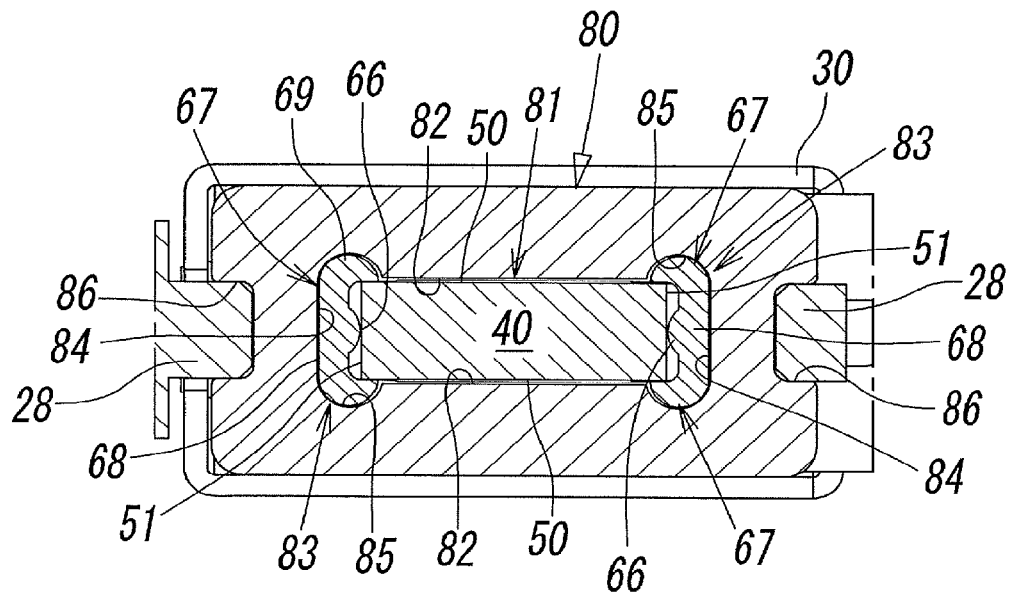
FIG. 14 is an enlarged sectional view of a main portion taken along line XIV-XIV of FIG. 1.
Figure 15:
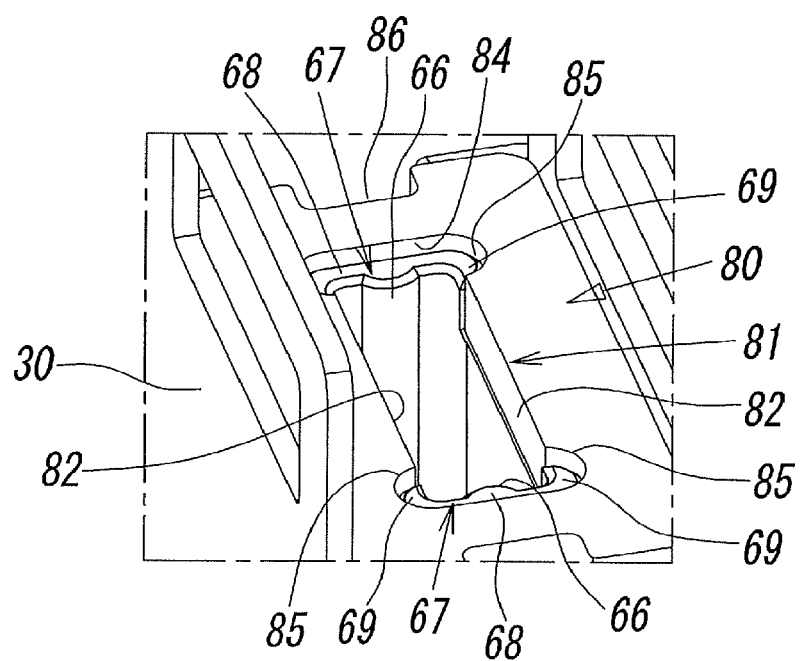
FIG. 15 is a schematic perspective view of the state where a magnetic ring is attached to an engagement protrusion of the bobbin.

As illustrated in FIG. 7 and FIG. 13 to FIG. 15, the engagement protruding walls 67 of the bobbin 60 each include a side wall portion 68, facing both side end surfaces 51 of the movable core 40, and semicircular arc-shaped wall portions 69 on both sides (upper and lower sides in FIG. 13) of the side wall portion 68. On the other hand, as illustrated in FIG. 7, FIG. 14, and FIG. 15, the engaged hole portion 81 of the magnetic ring 80 has a pair of first surface portions 82, extending parallel to each other to face the pair of surfaces 50 of the movable core 40, and second surface portions 83 on both sides of the first surface portions 82. The distance between the first surface portions 82 is longer than the thickness of the movable core 40 (distance between the pair of surfaces 50) and the distance between the intermediate portions 63 of the first inner surfaces 61 of the center hole 60a.

Each second surface portion 83 includes a straight portion 84, with which the engagement protruding wall 67 is engaged and which extends in the direction perpendicular to the first surface portion 82, and semicircular arc-shaped portions 85 on both sides of the straight portion 84. The straight portion 84 is engaged with the outer circumferential surface of the side wall portion 68 of the corresponding engagement protruding wall 67. The arc-shaped portions 85 are engaged with the outer circumferential surfaces of arc-shaped end portions 69 of the engagement protruding wall 67.

As illustrated in FIG. 14, the magnetic ring 80 has an outer circumferential surface, substantially rectangular in a plan view, and a pair of recesses 86, in both side surfaces of the outer circumferential surface in the width direction. The pair of recesses 86 are engaged with a pair of inward protrusions 28, disposed in the valve chest 11 of the valve body 10.

As described above, when the magnetic ring 80 is attached to the opening of the center hole 60a, as illustrated in FIG. 14, the engagement protruding wall 67 of the bobbin 60 and the engaged hole portion Si of the magnetic ring 80 are engaged with each other, and the recesses 86 and the inward protrusions 28 are engaged with each other. Thus, the magnetic ring 80 and the center hole 60a of the bobbin 60 have their axes aligned with each other. When the magnetic ring 80 is attached to the opening of the bobbin 60, the engagement protrusions 67 are interposed between the both side end surfaces 51 of the movable core 40 and the second surface portions 83 of the magnetic ring 80. In this state, a clearance is formed between each of the first surface portions 82 of the magnetic ring 80 and the corresponding surface 50 of the movable core 40. This structure prevents the movable core 40 and the magnetic ring 80 from coming into direct contact with each other. Thus, the efficiency of the solenoid portion 7 is securely prevented from being lowered.

In the solenoid valve 1 having the above structure, while the exciting coil 32 is not energized (demagnetized state), as illustrated in FIG. 1 and FIG. 2, the movable core 40 is spaced apart from the stationary core 35. While the exciting coil 32 is in the demagnetized state, the valve disk 3 is seated on the first valve seat 12 with the urging force of the elastic member 26 exerted thereon through the retainer 17 to block communication between the feed port P and the valve chest 11. At this time, the second valve seat 13 located to face the first valve seat 12 in the direction of the axis L is open, and the output port A communicates with the discharge port R through the discharge through hole 21 and the discharge communication path 24 in the valve chest 11. Thus, the pressurized fluid in the valve chest 11 is discharged to the outside through the discharge port R connected to the outside.

In the present embodiment, while the exciting coil 32 is in the demagnetized state, as illustrated in FIG. 3, the pair of support arms 45 of the movable core 40 have their far end surfaces 46 abutting against the pair of arm contact surfaces 27 of the bottom wall surface 14 of the valve chest 11. The valve disk 3 is seated on the first valve seat 12 in the valve opening 72 of the cap member 70, between the pair of support arms 45. At this time, the end surface (engaged portion 4) of the valve disk 3 facing the first valve seat 12 and the valve engagement portion 73 of the cap member 70 are not in contact with each other, and a gap G smaller than a stroke of the movable core 40 is formed between the engaged portion 4 and the valve engagement portion 73.

When the exciting coil 32 in this state is energized to be in the excited state, the movable core 40 is attracted to the stationary core 35, and shifted toward the stationary core 35 in the direction of the axis L against the urging force of the elastic member 26, which urges the valve disk 3 toward the first valve seat 12, as illustrated in FIG. 4 to FIG. 6. As illustrated in FIG. 6, with the shift of the movable core 40 in the direction of the axis L, the pair of support arms 45 of the movable core 40 are spaced apart from the arm contact surfaces 27, and the valve engagement portion 73 of the cap member 70 attached to between the support arms 45 is engaged with the engaged surface 4 of the valve disk 3. The valve disk 3 seated on the first valve seat 12 is shifted toward the second valve seat 13 while having the guide grooves 3a supported by the support arms 45.

As described above, the gap G is formed between the engaged portion 4 of the valve disk 3 and the valve engagement portion 73 of the cap member 70. Thus, when the exciting coil 32 is switched to the excited state, instead of the valve disk 3 being shifted toward the second valve seat 13 concurrently with the shift of the movable core 40, the gap G between the engaged portion 4 and the valve engagement portion 73 is contracted first, and after the gap G is reduced to zero, the valve engagement portion 73 is engaged with the engaged portion 4 of the valve disk 3, and then the valve disk 3 moves toward the second valve seat 13.

With attraction of the movable core 40, the valve disk 3 is seated on the second valve seat 13 to close the discharge through hole 21 and release the first valve seat 12 facing the second valve seat 13. Consequently, the feed port P communicates with the output port A through the feed through hole 15 and the valve chest 11, and the pressurized fluid fed from the feed port P is output through the output port A (see FIG. 4 to FIG. 6). Here, the valve engagement portion 73 of the cap member 70 disposed at the pair of support arms 45 is formed of a thin plate resilient in the direction of the axis L. When the valve disk 3 is seated on the second valve seat 13, the force exerted on the valve disk 3 in the direction of the axis L can be absorbed by the valve engagement portion 73. This structure can prevent the valve disk 3 from being worn out or irreversibly deformed (permanently deformed) with such a force being repeatedly exerted on the valve disk 3.

When the exciting coil 32 stops being energized to be switched to the demagnetized state, illustrated in FIG. 1 to FIG. 3, the movable core 40 is spaced apart from the stationary core 35, and the valve disk 3 is spaced apart from the second valve seat 13 with the urging force of the elastic member 26. As described above, the valve disk 3 closes the first valve seat 12 and releases the second valve seat 13, so that the output port A communicates with the discharge port R through the valve chest 11, and is exposed to the atmosphere. At this time, the flat far end surfaces 46 of the pair of support arms 45 abut against the pair of arm contact surfaces 27, which are parallel to the far end surfaces 46, so that the movable core 40 is accurately positioned with respect to the valve body 10. Thus, the responsiveness of the solenoid valve can be more accurately controlled.

When the far end surfaces 46 of the support arms 45 abut against the arm contact surfaces 27, the valve disk 3 is seated on the first valve seat 12 while having the gap G formed between the engaged portion 4 facing the first valve seat 12 and the valve engagement portion 73 of the cap member 70. This structure can prevent the kinetic energy of the movable core 40 from being directly exerted on the valve disk 3 when the valve disk 3 is seated on the first valve seat 12, and can thus reduce the external force exerted on the valve disk 3 in the direction of the axis L. Thus, the valve disk 3 can be prevented from being worn out or irreversibly deformed (permanently deformed) with such an external force being repeatedly exerted on the valve disk 3, so that the dimension of the valve disk 3 in the direction of the axis L can be prevented from being changed over time. Consequently, the stroke of the movable core 40, that is, the distance from the first valve seat 12 to the valve disk 3 can be prevented from being varied. Thus, the flow rate of the fluid flowing through the valve seat 12 or the responsiveness of the solenoid valve can be prevented from being varied as much as possible.

As described above, the solenoid valve 1 according to the present invention can reduce the number of components and simplify the structure or form of the movable core 40 by seamlessly integrating the iron core 43 and the valve support portion of the movable core 40 together. This structure can thus reduce manufacturing cost.

Thus far, a solenoid valve according to the present invention has been described. However, the invention of the present application is not limited to the above embodiment, and may naturally be changed in design in various manners within the scope not departing from the gist of claims.

For example, although a three-port solenoid valve is described in the above example, the number of ports is not limited to this, and may be two.

REFERENCE SIGNS LIST 1 solenoid valve
3 valve disk
3a guide groove
4 engaged portion
7 solenoid portion
10 valve body
11 valve chest
12 first valve seat
13 second valve seat
14 bottom wall surface
26 elastic member
27 arm contact surface
40 movable core
43 iron core
43a end surface
45 support arm (valve support portion)
47 engagement hook
50 surface
51 side end surface
60 bobbin
60a center hole
61 first inner surface
62 side portion
63 intermediate portion
64 step portion
65 second inner surface
66 convex thread
67 engagement protruding wall
70 cap member
71 engagement opening
72 valve opening
73 valve engagement portion
80 magnetic ring
81 engaged hole portion
A output port
P feed port
R discharge port

The invention claimed is:

1. A solenoid valve, comprising:
a movable core having a first end, on one side in an axial direction, and a second end, on the other side in the axial direction, the movable core shifting in the axial direction in response to an excitation effect of a solenoid;
a valve body including a plurality of ports, into or out of which a pressurized fluid flows, and a valve chest with which the ports communicate; and
a valve disk accommodated in the valve chest, the valve disk moving toward and away from a valve seat in the valve chest in response to the movable core shifting in the axial direction to change connection states between the ports,
wherein the movable core includes an iron core disposed closer to the first end and formed into a plate having a substantially rectangular section, and a valve support portion disposed closer to the second end and continuous with the iron core,
wherein the valve support portion includes a pair of support arms, and the pair of support arms are arranged side by side in a width direction of the movable core to be parallel to each other and seamlessly integrated with the iron core,
wherein both surfaces of the movable core facing in a thickness direction are single flat surfaces parallel to each other and extending continuously from the iron core to the pair of support arms, and
wherein the valve disk is supported between the pair of support arms.

2. The solenoid valve according to claim 1,
wherein the valve disk is supported between the pair of support arms to be movable relative to the support arms in the axial direction,
wherein an elastic member is disposed inside the valve chest, the elastic member urging the valve disk toward the valve seat to cause the valve disk to be seated on the valve seat, and
wherein the pair of support arms each include a valve engagement portion, which is engaged with an engaged portion of the valve disk seated on the valve seat when the movable core shifts in a direction opposite to the direction in which the elastic member urges the valve disk, and separates the valve disk apart from the valve seat against an urging force of the elastic member.

3. The solenoid valve according to claim 2,
wherein, when the valve disk is seated on the valve seat by the elastic member with the movable core shifting in the direction in which the elastic member urges the valve disk, the valve engagement portion is not in contact with the valve disk.

4. The solenoid valve according to claim 3,
wherein the valve seat is disposed on a bottom wall surface of the valve chest facing the second end of the movable core,
wherein far end surfaces of the support arms are flat surfaces perpendicular to an axis,
wherein the bottom wall surface has an arm contact surface, the arm contact surface is a flat surface parallel to the far end surfaces of the support arms, and the far end surfaces move toward and away from the arm contact surface in response to a shift of the movable core, and
wherein, when the valve disk is seated on the valve seat with the movable core being shifted toward the second end, the far end surfaces of the support arms abut against the arm contact surface, and a gap having a dimension in the axial direction smaller than a stroke of the movable core is formed between the valve engagement portion and the engaged portion of the valve disk.

5. The solenoid valve according to claim 2,
wherein the valve seat is a first valve seat formed on the bottom wall surface of the valve chest, and a second valve seat is disposed in the valve chest at a position facing the first valve seat along the axis, wherein the valve disk is disposed between the first valve seat and the second valve seat, and continuously urged by the elastic member toward the first valve seat, and wherein the valve engagement portion on the pair of support arms is formed of a thin plate resilient in the axial direction, and the valve engagement portion is engaged with the engaged portion of the valve disk seated on the first valve seat when the movable core shifts from the second end toward the first end, and separates the valve disk from the first valve seat against an urging force of the elastic member to cause the valve disk to be seated on the second valve seat.

6. The solenoid valve according to claim 5, wherein the pair of support arms include, at far end portions, engagement hooks protruding in directions away from each other, wherein a cap member formed of a metal thin plate having a substantially U-shaped section is attached to between the far end portions of the pair of support arms, and the cap member has a pair of engagement openings, which are engaged with the engagement hooks of the pair of support arms, and a valve opening, which is formed between the pair of engagement openings and allows the valve disk to be seated on the first valve seat therethrough, wherein the valve engagement portion is disposed at a circumferential portion of the valve opening, and wherein the engaged portion is disposed on an end surface of the valve disk facing the first valve seat.

7. The solenoid valve according to claim 2, wherein the valve disk includes a pair of guide grooves open in opposite directions and extending in the axial direction, the pair of support arms are fitted to the pair of guide grooves to be movable relative to each other in the axial direction, and the valve disk is supported between the pair of support arms to be slidable in the axial direction.

8. The solenoid valve according to claim 7, wherein the valve seat is disposed on a bottom wall surface of the valve chest facing the second end of the movable core, wherein the pair of support arms include engagement hooks protruding in directions away from each other, wherein a cap member formed of a metal thin plate having a substantially U-shaped section is attached to between far end portions of the pair of support arms, and the cap member has a pair of engagement openings, which are engaged with the engagement hooks of the pair of support arms, and a valve opening, which is formed between the pair of engagement openings and allows the valve disk to be seated on the first valve seat therethrough, and wherein the valve engagement portion is disposed at a circumferential portion of the valve opening, and the valve engagement portion is engaged with an end surface of the valve disk facing the valve seat when the movable core shifts from the second end toward the first end.

9. The solenoid valve according to claim 1, wherein the solenoid valve includes a solenoid portion, and the solenoid portion includes a bobbin and a magnetic ring, the bobbin having a center hole in which an iron core of the movable core is fitted to be slidable in the axial direction, the bobbin including a coil wound around an outer periphery of the bobbin, the magnetic ring being disposed to surround an opening of the center hole at an end of the bobbin located closer to the valve body, wherein the center hole of the bobbin has a substantially rectangular section, and has a pair of first inner surfaces and a pair of second inner surfaces, the pair of first inner surfaces face a pair of surfaces of the iron core parallel to each other and on both sides in a thickness direction of the iron core, and the pair of second inner surfaces face a pair of side end surfaces of the iron core parallel to each other and at both ends in a width direction of the iron core, wherein step portions are disposed on both side portions of the pair of first inner surfaces in a width direction of the first inner surfaces to reduce a distance between the first inner surfaces to be shorter than a distance between intermediate portions, the step portions are continuous with the second inner surfaces, and a pair of convex threads extending in the axial direction are disposed on the pair of second inner surfaces, and wherein the pair of side end surfaces of the iron core are supported by the pair of convex threads to be slidable in the axial direction, the pair of surfaces of the iron core are supported by the step portions to be slidable in the axial direction, and the iron core portion extends through the magnetic ring and has a far end protruding toward the valve body.

10. The solenoid valve according to claim 9, wherein a pair of engagement protruding walls extending in the axial direction from the pair of second inner surfaces are disposed at the opening of the center hole, and wherein the magnetic ring has an engaged hole portion to which the engagement protruding walls are fitted, and the magnetic ring is positioned coaxially with the bobbin as a result of the engagement protruding walls being fitted to the engaged hole portion.

* * * * *